United States Patent
Leber

[15] 3,670,423
[45] June 20, 1972

[54] VEHICLE BACKING GUIDANCE DEVICE

[72] Inventor: Don Leber, 733 Oak St., Colusa, Calif. 95932

[22] Filed: Jan. 6, 1970

[21] Appl. No.: 920

[52] U.S. Cl. ............................................................33/286
[51] Int. Cl. ....................................................G01c 1/00
[58] Field of Search .....................................33/46 AS, 185.5

[56] References Cited

UNITED STATES PATENTS

| 2,161,457 | 6/1939 | Critchlow | 33/46 AS |
| 2,091,028 | 8/1937 | Darling | 33/46 AS |
| 2,984,011 | 5/1961 | Hamilton | 33/46 AS |

*Primary Examiner*—Leonard Forman
*Assistant Examiner*—Paul G. Foldes
*Attorney*—Alexander B. Blair

[57] ABSTRACT

A horizontal scale is attached to the rear window of a motor vehicle to align either with a particular element on a towed vehicle or with a scale attached to such vehicle so that the driver can accurately back the towing vehicle for hooking-up with the towed vehicle and for backing the latter in a straight line or at an angle as indicated by the scale. Similar scales are also attachable to an inside rear view mirror or to the outside rear view mirrors of a tractor to provide guide means for the same purposes.

1 Claim, 8 Drawing Figures

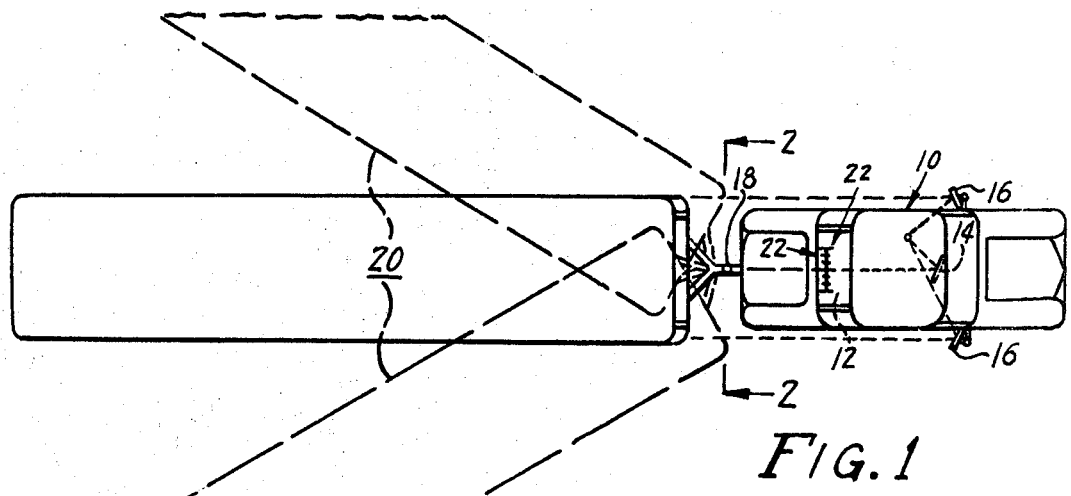
FIG. 1
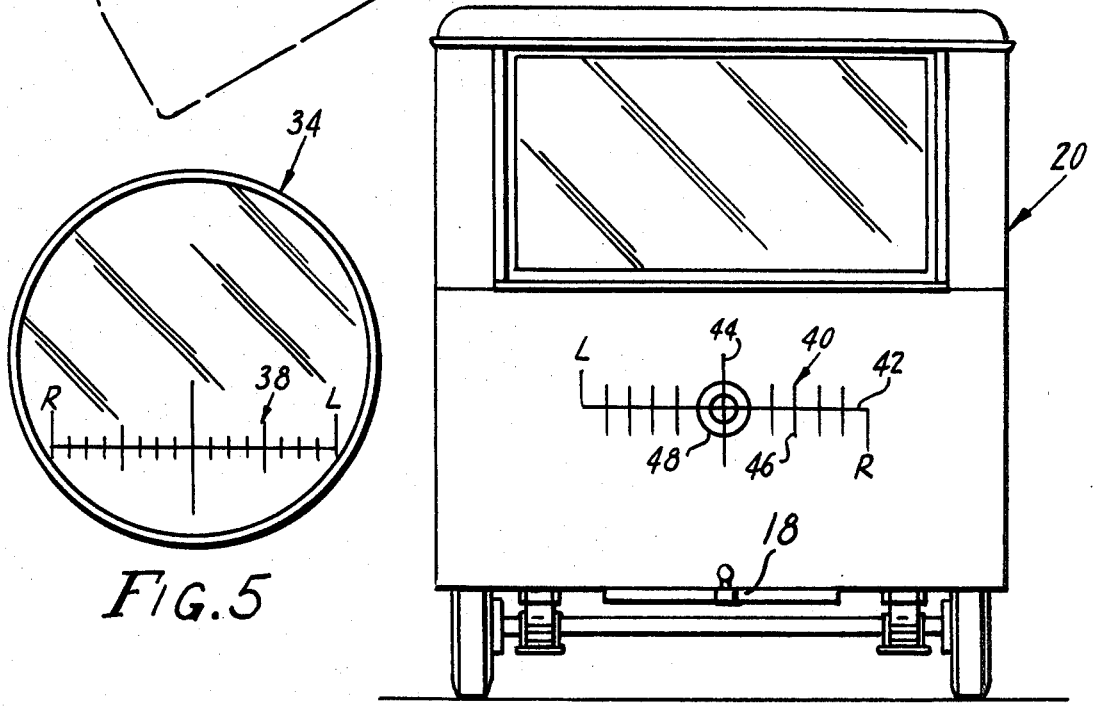
FIG. 2
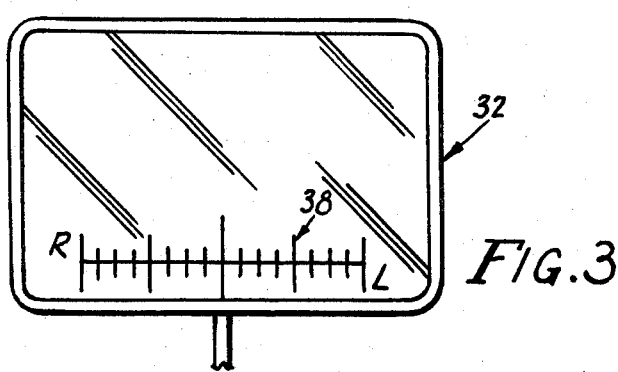
FIG. 5
FIG. 3
INVENTOR.
DON LEBER
BY
Alexander B. Blair
ATTORNEY.

INVENTOR.
DON LEBER
BY
Alexander B. Blair
ATTORNEY.

VEHICLE BACKING GUIDANCE DEVICE

SUMMARY OF THE INVENTION

At least one scale is used with the device, and this scale will be used, where possible, in the rear window of the vehicle to provide as clear a view through the rear window as possible. The scale comprises a relatively elongated vertical center line centered with respect to the rear window, an elongated horizontal line extending in opposite directions from the vertical center line, and shorter vertical calibration-like lines at spaced points along the horizontal line. This scale is preferably provided through the medium of a decalcomania which, when applied and then removed, leaves only the lines referred to on the rear window. The driver can turn his head toward the right to look back through the rear window to sight the center line with a center point or object on a towed vehicle to assist him in guiding the towing vehicle rearwardly in a straight line for hooking-up with the towed vehicle and for guiding the towed vehicle. If the towed vehicle starts to turn slightly toward the right as the driver looks backwardly through the window, that is, toward the left of the vehicle, the driver may turn the steering wheel to the right to correct the deviation. Similarly, if the towed vehicle is to be turned one way or the other, the operator may sight a point or object on the towed vehicle with respect to a selected calibration line to one side or the other of the center line. Having determined the angle of turn, the driver will maintain alignment between the calibration line and the point or object on the towed vehicle.

Where the towed vehicle is a wide flat front vehicle, a similar scale is attached to the front wall of the towed vehicle to be aligned with the scale of the rear window of the towing vehicle.

Where the towing vehicle has an obstructed rear window, the opposite side rear view mirrors of the towing vehicle may be provided with calibrations through which the driver may sight, for example, a front corner of the trailer to similarly assist him in guiding the towing vehicle for hook-up with the towed vehicle and for guiding the trailer for rearward movement.

Alternatively, an inside center rear view mirror, where the rear window of the towing vehicle is not obstructed, may be provided with one of the scales by which the operator, maintaining his normal driving position, may sight through the scale on the inside rear view mirror, thence through the scale on the rear window to align the two proper points with a point or object on the towed vehicle or on the scale thereon. Accordingly, it will be apparent that the towing vehicle is provided with at least one scale, the lines of which the operator may align with a desired point on the towed vehicle to assist him in backing the towing vehicle for hook-up with the trailer and for backing the latter. Of course, the towed vehicle may be a freight trailer, a house trailer, or a boat trailer or any other towed vehicle.

BRIEF DESCRIPTION OF THE DRAWINGS

FIG. 1 is a plan view of a combination towing vehicle and trailer, the latter being shown in solid lines in alignment with the towing vehicle and in dotted lines at angles at which it may be desired to back the towed vehicle;

FIG. 2 is a front elevation of a towed vehicle having a scale thereon;

FIG. 3 is a face view of an inside rear view mirror of a tractor or other towing vehicle;

FIG. 5 is a face view of an inside mirror of a different type and circular in form;

DESCRIPTION OF THE PREFERRED EMBODIMENTS

Figure 4:
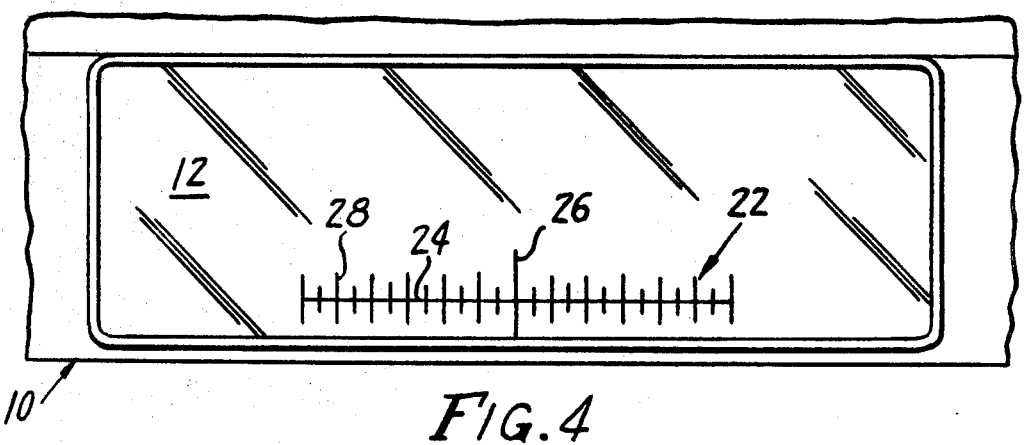
FIG. 4 is a fragmentary rear elevation of the rear window of a towing vehicle showing the guide scale along the bottom portion of the window.

Referring to FIG. 1, the numeral 10 designates a towing vehicle which may be of conventional type or a tractor, provided with a rear window 12, an inside mirror 14 and duplicate outside mirrors 16. The vehicle 10 is shown as being connected by a conventional hitch 18 to a towed vehicle 20 shown in the present instance as a trailer in the nature of a freight trailer.

One of the difficulties encountered by tractor drivers is backing his vehicle to connect it to a trailer. It frequently is necessary to make several "passes" to properly align the vehicles for properly connecting the trailer hitch. The primary purpose of the present construction is to greatly facilitate the aligning of the vehicles for the hook-up operation.

The rear window 12 (FIG. 4) is provided with a scale 22 which is provided with an elongated horizontal line 24, a somewhat elongated vertical center line 26 and calibration-like shorter vertical lines 28 spaced apart on opposite sides of the center line 26. This scale is arranged horizontally adjacent the bottom of the window 12 and may be identical with the scale shown in FIG. 6 against a different type of rear view mirror 30, with the scale in FIG. 4 arranged along the top of a window. This scale preferably but not necessarily is arranged near the top or bottom of the rear window so as to leave the rear window as unobstructed as possible. The scale lines in either case will preferably be applied by a decalcomania which, when applied to window and then removed, will leave only the lines of the scale to reduce view obstruction through the rear window.

As described below, the scale 22 may be the only one which is desired to be used, but in the interest of ease of operation, it is preferred that other scales be used. For example, any of the rear view mirrors 32 (FIG. 3), 34 (FIG. 5), or 36 (FIG. 7) may be provided with a scale 38 similar to the scale previously described except that such scales preferably, but not necessarily, are provided with the designations "R" and "L" for right and left. These designations are reversed from normal since the mirror reverses the right and left sides of the objects viewed. This reversal is desired since if the operator turns his head toward the right to look backwardly through the rear window 12, his right side will correspond to the left side of the towed vehicle.

In FIG. 2 there is shown a scale 40 applied against the front face of a trailer, which may be a trailer 20 or a house trailer. This scale is generally similar to the scales previously described, including an elongated horizontal line 42, a somewhat elongated vertical center line 44 and spaced shorter vertical lines 46. The junction of the lines 42 and 44 may be provided with target-like circles 48 which may assist the driver in spotting the center point of the scale.

Figures 7, 8:
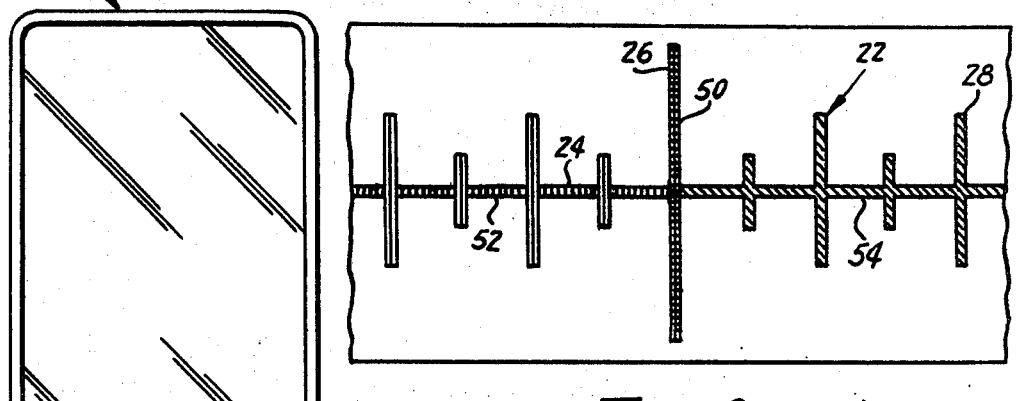
FIG. 7 is a face view of another type of outside mirror.
FIG. 8 is an enlarged fragmentary face view of one of the scales showing how the lines thereof may be colored.

In FIG. 8 an enlargement of one of the scales, for example, the scale 22 is shown, wherein it will be noted that the various lines 24, 26 and 28 are relatively wide and may be colored to assist the operator in judging the scale. For example, the line 26 may be colored blue as at 50, the lines to the left of the line 26 may be colored red as at 52, and the lines to the right of the line 26 may be colored green.

OPERATION

Figure 6:
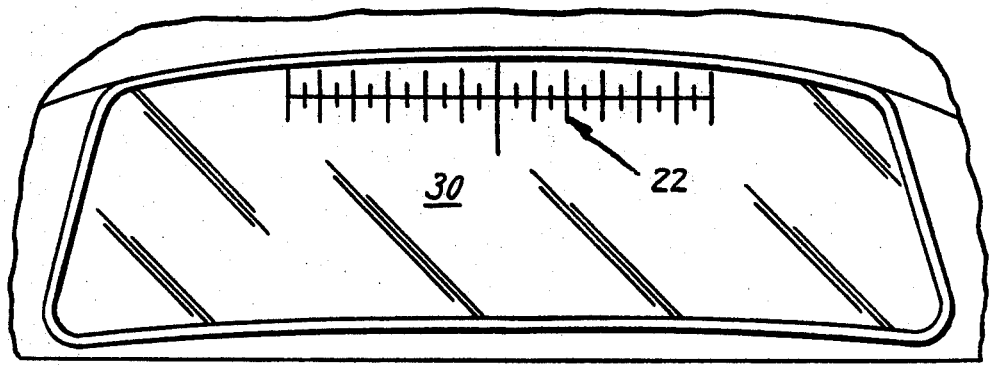
FIG. 6 is a view similar to FIG. 4 showing the scale along the top portion of the rear window of a towing vehicle.

Assuming that the rear window 12 is not obscured, the operator may turn his head to the right to look backwardly through the window 12 and to align the center line 26 with a center point or object on the towed vehicle. Keeping such point or object in alignment with the line 26, the driver may back directly in a line. This greatly facilitates the aligning of the two vehicles in a single "pass" so that the trailer hitch may more easily be connected. The device also facilitates the backing of the towed vehicle after the hooking-up of the two vehicles. If the towed vehicle is to be backed at an angle, the operator will swing the steering wheel in the proper direction. For example, if the towed vehicle is to be backed to the left, the operator will turn the steering wheel toward the right until it aligns one of the lines 28 with the center point or object on the towed vehicle. Conversely, in a similar manner, if the towed vehicle is to be backed toward the right, the steering wheel will be turned toward the left. The scale 22 will greatly assist the driver, and particularly if he is a novice, in backing the towed vehicle.

Where the towed vehicle is a broad trailer as at 20, the front wall of the trailer may be provided with the scale 40 (FIG. 2) and the operator may align the center line 26 with the center line 44 to back straight in a line. If the backing is to be at an angle, the center line 44 of the trailer may be aligned with one of the lines 28 of the scale 22, or the line 26 may be aligned with one of the lines 46 of the scale 40. The two scales in FIGS. 4 and 6 are used identically, it being preferred that the scales be arranged horizontally adjacent the top or bottom of the rear window. For use with the scale of FIG. 4, the scale 40 will be arranged lower, and for use with the scale of FIG. 6, it will be arranged higher.

Where the rear window is not obscured, the operator may use the scale 38 on the inside rear view mirror 14, sighting the center line of the scale of such mirror with the center line of the scale 22 to align these lines with a point or object on the towed vehicle or with the proper point on the scale 40.

In a case of a tractor pulling a large trailer, it often is impossible for the operator to see through the rear window. In this case, the outside mirrors 16 will be used. The operator may sight in either mirror to align the center line thereof with the corresponding front corner of the trailer 20, as suggested in dotted lines in FIG. 1. Where a substantial angular backing is done under such conditions, the trailer may be provided with a longer scale 40 so that as the trailer assumes an angle relative to the tractor, the operator may align one of the lines on one of the rear view mirrors with the outer lines on the scale 40.

In either operation, it will be apparent that the invention is quite simple and involves basically a scale associated with the towing vehicle by which the operator can determine the angle of backing of such vehicle by aligning a point on the scale of the towing vehicle with a point on the towed vehicle or with a line on the scale thereof. In one practice of the invention, where the rear window is unobstructed, three scales may be used, namely, the scale on the rear view mirror in the vehicle, the scale 22 and the scale 40. In either case, the device is extremely helpful to the driver and particularly if he is a novice, and is particularly useful in hooking-up the two vehicles.

From the foregoing it will now be seen that there is herein provided an improved vehicle backing guidance device which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

I claim:

1. A guide apparatus for facilitating hook up of tractor-trailer combinations of the type wherein the tractor has a rear to which the trailer is attachable comprising a rear view mirror element connected to the tractor, first scale means on said mirror element, a transparent glass rear window mounted on the rear of the tractor, second scale means on said glass rear window, and third scale means on the front end of the trailer, said scales each including spaced indicia, a selected point on said first scale means cooperating with a selected point on said second scale means defining a line of sight for the driver, enabling the driver to sight a first selected point on said third scale means relative to his line of vision between second and third selected points on said first and second scale means to assist the driver in aligning the two vehicles for hook-up.

* * * * *